(12) United States Patent
Batra (10) Patent No.: US 8,960,545 B1
(45) Date of Patent: Feb. 24, 2015

(54) DATA MODIFICATION FOR MAGNETIC CARDS AND DEVICES

(71) Applicant: Gautam Batra, Pittsburgh, PA (US)

(72) Inventor: Gautam Batra, Pittsburgh, PA (US)

(73) Assignee: Dynamics Inc., Pittsburgh, PA (US)

( * ) Notice: Subject to any disclaimer, the term of this patent is extended or adjusted under 35 U.S.C. 154(b) by 46 days.

(21) Appl. No.: 13/679,228

(22) Filed: Nov. 16, 2012

Related U.S. Application Data (60) Provisional application No. 61/562,165, filed on Nov. 21, 2011.

(51) Int. Cl.
  G06K 7/08 (2006.01)
  G06K 1/12 (2006.01)

(52) U.S. Cl.
  CPC ..................... G06K 1/125 (2013.01)
  USPC .......................... 235/449; 235/380

(58) Field of Classification Search
  USPC .......................... 235/449, 380, 375
  See application file for complete search history.

(56) References Cited

U.S. PATENT DOCUMENTS

| | | |
|---|---|---|
| 4,353,064 A | 10/1982 | Stamm |
| 4,394,654 A | 7/1983 | Hofmann-Cerfontaine |
| 4,614,861 A | 9/1986 | Pavlov et al. |
| 4,667,087 A | 5/1987 | Quintana |
| 4,701,601 A | 10/1987 | Francini et al. |
| 4,720,860 A | 1/1988 | Weiss |
| 4,786,791 A | 11/1988 | Hodama |
| 4,791,283 A | 12/1988 | Burkhardt |
| 4,797,542 A | 1/1989 | Hara |
| 5,038,251 A | 8/1991 | Sugiyama et al. |
| 5,168,520 A | 12/1992 | Weiss |
| 5,237,614 A | 8/1993 | Weiss |
| 5,276,311 A | 1/1994 | Hennige |
| 5,347,580 A | 9/1994 | Molva et al. |
| 5,361,062 A | 11/1994 | Weiss et al. |
| 5,412,199 A | 5/1995 | Finkelstein et al. |
| 5,434,398 A | 7/1995 | Goldberg |
| 5,434,405 A | 7/1995 | Finkelstein et al. |
| 5,478,994 A | 12/1995 | Rahman |

(Continued)

FOREIGN PATENT DOCUMENTS

| | | |
|---|---|---|
| JP | 05210770 A | 8/1993 |
| WO | WO9852735 | 11/1998 |

(Continued)

OTHER PUBLICATIONS

U.S. Appl. No. 60/594,300, Poidomani et al.

(Continued)

*Primary Examiner* — Ahshik Kim (57) ABSTRACT

Programming fixtures are provided that program devices, such as payment cards, with data, such as personal data, using light transmitters and receivers for powered cards, or using magnetic write heads for non-powered cards. A processor within the powered card computes a magnetic stripe message and associated longitudinal redundancy check (LRC) value based upon the personal data. The processor compares the LRC value against a list of LRC exceptions and changes the magnetic stripe message to change the LRC value based upon a positive comparison. A programming fixture may compute the magnetic stripe message and may change the magnetic stripe message before writing the magnetic stripe message to a static magnetic stripe upon a detection that the associated LRC value matches an LRC exception.

20 Claims, 4 Drawing Sheets

(56) References Cited

U.S. PATENT DOCUMENTS

| | | |
|---|---|---|
| 5,479,512 A | 12/1995 | Weiss |
| 5,479,530 A * | 12/1995 | Nair et al. ............ 382/119 |
| 5,484,997 A | 1/1996 | Haynes |
| 5,485,519 A | 1/1996 | Weiss |
| 5,585,787 A | 12/1996 | Wallerstein |
| 5,591,949 A | 1/1997 | Bernstein |
| 5,608,203 A | 3/1997 | Finkelstein et al. |
| 5,623,552 A | 4/1997 | Lane |
| 5,657,388 A | 8/1997 | Weiss |
| 5,834,747 A | 11/1998 | Cooper |
| 5,834,756 A | 11/1998 | Gutman et al. |
| 5,856,661 A | 1/1999 | Finkelstein et al. |
| 5,864,623 A | 1/1999 | Messina et al. |
| 5,907,142 A | 5/1999 | Kelsey |
| 5,913,203 A | 6/1999 | Wong et al. |
| 5,937,394 A | 8/1999 | Wong et al. |
| 5,955,021 A | 9/1999 | Tiffany, III |
| 5,956,699 A | 9/1999 | Wong et al. |
| 6,025,054 A | 2/2000 | Tiffany, III |
| 6,045,043 A | 4/2000 | Bashan et al. |
| 6,076,163 A | 6/2000 | Hoffstein et al. |
| 6,085,320 A | 7/2000 | Kaliski |
| 6,095,416 A | 8/2000 | Grant et al. |
| 6,130,621 A | 10/2000 | Weiss |
| 6,145,079 A | 11/2000 | Mitty et al. |
| 6,157,920 A | 12/2000 | Jakobsson et al. |
| 6,161,181 A | 12/2000 | Haynes, III et al. |
| 6,176,430 B1 | 1/2001 | Finkelstein et al. |
| 6,182,894 B1 | 2/2001 | Hackett et al. |
| 6,189,098 B1 | 2/2001 | Kaliski |
| 6,199,052 B1 | 3/2001 | Mitty et al. |
| 6,206,293 B1 | 3/2001 | Gutman et al. |
| 6,240,184 B1 | 5/2001 | Huynh et al. |
| 6,241,153 B1 | 6/2001 | Tiffany, III |
| 6,256,873 B1 | 7/2001 | Tiffany, III |
| 6,269,163 B1 | 7/2001 | Rivest et al. |
| 6,286,022 B1 | 9/2001 | Kaliski et al. |
| 6,308,890 B1 | 10/2001 | Cooper |
| 6,313,724 B1 | 11/2001 | Osterweil |
| 6,389,442 B1 | 5/2002 | Yin et al. |
| 6,393,447 B1 | 5/2002 | Jakobsson et al. |
| 6,411,715 B1 | 6/2002 | Liskov et al. |
| 6,446,052 B1 | 9/2002 | Juels |
| 6,460,141 B1 | 10/2002 | Olden |
| 6,592,044 B1 | 7/2003 | Wong et al. |
| 6,607,127 B2 | 8/2003 | Wong |
| 6,609,654 B1 | 8/2003 | Anderson et al. |
| 6,631,849 B2 | 10/2003 | Blossom |
| 6,655,585 B2 | 12/2003 | Shinn |
| 6,681,988 B2 | 1/2004 | Stack et al. |
| 6,705,520 B1 | 3/2004 | Pitroda et al. |
| 6,755,341 B1 | 6/2004 | Wong et al. |
| 6,764,005 B2 | 7/2004 | Cooper |
| 6,769,618 B1 | 8/2004 | Finkelstein |
| 6,805,288 B2 | 10/2004 | Routhenstein et al. |
| 6,811,082 B2 | 11/2004 | Wong |
| 6,813,354 B1 | 11/2004 | Jakobsson et al. |
| 6,817,532 B2 | 11/2004 | Finkelstein |
| 6,873,974 B1 | 3/2005 | Schutzer |
| 6,902,116 B2 | 6/2005 | Finkelstein |
| 6,970,070 B2 | 11/2005 | Juels et al. |
| 6,980,969 B1 | 12/2005 | Tuchler et al. |
| 6,985,583 B1 | 1/2006 | Brainard et al. |
| 6,991,155 B2 | 1/2006 | Burchette, Jr. |
| 7,013,030 B2 | 3/2006 | Wong et al. |
| 7,035,443 B2 | 4/2006 | Wong |
| 7,039,223 B2 | 5/2006 | Wong |
| 7,044,394 B2 | 5/2006 | Brown |
| 7,051,929 B2 | 5/2006 | Li |
| 7,083,094 B2 | 8/2006 | Cooper |
| 7,100,049 B2 | 8/2006 | Gasparini et al. |
| 7,100,821 B2 | 9/2006 | Rasti |
| 7,111,172 B1 | 9/2006 | Duane et al. |
| 7,114,652 B2 | 10/2006 | Moullette et al. |
| 7,136,514 B1 | 11/2006 | Wong |
| 7,140,550 B2 | 11/2006 | Ramachandran |
| 7,163,153 B2 | 1/2007 | Blossom |
| 7,195,154 B2 | 3/2007 | Routhenstein |
| 7,197,639 B1 | 3/2007 | Juels et al. |
| 7,219,368 B2 | 5/2007 | Juels et al. |
| 7,225,537 B2 | 6/2007 | Reed |
| 7,225,994 B2 | 6/2007 | Finkelstein |
| 7,246,752 B2 | 7/2007 | Brown |
| 7,298,243 B2 | 11/2007 | Juels et al. |
| 7,334,732 B2 | 2/2008 | Cooper |
| 7,337,326 B2 | 2/2008 | Palmer et al. |
| 7,346,775 B2 | 3/2008 | Gasparinl et al. |
| 7,356,696 B1 | 4/2008 | Jakobsson et al. |
| 7,357,319 B1 | 4/2008 | Lin et al. |
| 7,359,507 B2 | 4/2008 | Kaliski |
| 7,360,688 B1 | 4/2008 | Harris |
| 7,363,494 B2 | 4/2008 | Brainard et al. |
| 7,380,710 B2 | 6/2008 | Brown |
| 7,398,253 B1 | 7/2008 | Pinnell |
| 7,404,087 B2 | 7/2008 | Teunen |
| 7,424,570 B2 | 9/2008 | D'Albore et al. |
| 7,427,033 B1 | 9/2008 | Roskind |
| 7,454,349 B2 | 11/2008 | Teunen et al. |
| 7,461,250 B1 | 12/2008 | Duane et al. |
| 7,461,399 B2 | 12/2008 | Juels et al. |
| 7,472,093 B2 | 12/2008 | Juels |
| 7,472,829 B2 | 1/2009 | Brown |
| 7,494,055 B2 | 2/2009 | Fernandes et al. |
| 7,502,467 B2 | 3/2009 | Brainard et al. |
| 7,502,933 B2 | 3/2009 | Jakobsson et al. |
| 7,503,485 B1 | 3/2009 | Routhenstein |
| 7,516,492 B1 | 4/2009 | Nisbet et al. |
| 7,523,301 B2 | 4/2009 | Nisbet et al. |
| 7,530,495 B2 | 5/2009 | Cooper |
| 7,532,104 B2 | 5/2009 | Juels |
| 7,543,739 B2 | 6/2009 | Brown et al. |
| 7,559,464 B2 | 7/2009 | Routhenstein |
| 7,562,221 B2 | 7/2009 | Nystrom et al. |
| 7,562,222 B2 | 7/2009 | Gasparini et al. |
| 7,580,898 B2 | 8/2009 | Brown et al. |
| 7,584,153 B2 | 9/2009 | Brown et al. |
| 7,591,426 B2 | 9/2009 | Osterweil et al. |
| 7,591,427 B2 | 9/2009 | Osterweil |
| 7,602,904 B2 | 10/2009 | Juels et al. |
| 7,631,804 B2 | 12/2009 | Brown |
| 7,639,537 B2 | 12/2009 | Sepe et al. |
| 7,641,124 B2 | 1/2010 | Brown et al. |
| 7,660,902 B2 | 2/2010 | Graham et al. |
| 7,828,207 B2 | 11/2010 | Cooper |
| 2001/0034702 A1 | 10/2001 | Mockett et al. |
| 2001/0047335 A1 | 11/2001 | Arndt et al. |
| 2002/0059114 A1 | 5/2002 | Cockrill et al. |
| 2002/0082989 A1 | 6/2002 | Fife et al. |
| 2002/0096570 A1 | 7/2002 | Wong et al. |
| 2002/0120583 A1 | 8/2002 | Keresman, III et al. |
| 2003/0034388 A1 | 2/2003 | Routhenstein et al. |
| 2003/0052168 A1 | 3/2003 | Wong |
| 2003/0057278 A1 | 3/2003 | Wong |
| 2003/0116635 A1 | 6/2003 | Taban |
| 2003/0152253 A1 | 8/2003 | Wong |
| 2003/0163287 A1 | 8/2003 | Vock et al. |
| 2003/0173409 A1 | 9/2003 | Vogt et al. |
| 2003/0179909 A1 | 9/2003 | Wong et al. |
| 2003/0179910 A1 | 9/2003 | Wong |
| 2003/0226899 A1 | 12/2003 | Finkelstein |
| 2004/0035942 A1 | 2/2004 | Silverman |
| 2004/0133787 A1 | 7/2004 | Doughty |
| 2004/0162732 A1 | 8/2004 | Rahim et al. |
| 2004/0172535 A1 | 9/2004 | Jakobsson |
| 2004/0177045 A1 | 9/2004 | Brown |
| 2005/0043997 A1 | 2/2005 | Sohata et al. |
| 2005/0080747 A1 | 4/2005 | Anderson et al. |
| 2005/0086160 A1 | 4/2005 | Wong et al. |
| 2005/0086177 A1 | 4/2005 | Anderson et al. |
| 2005/0116026 A1 | 6/2005 | Burger et al. |
| 2005/0119940 A1 | 6/2005 | Concilio et al. |
| 2005/0154643 A1 | 7/2005 | Doan et al. |
| 2005/0228959 A1 | 10/2005 | D'Albore et al. |
| 2006/0000900 A1 | 1/2006 | Fernandes et al. |

(56) References Cited

U.S. PATENT DOCUMENTS

| | | |
|---|---|---|
| 2006/0037073 A1 | 2/2006 | Juels et al. |
| 2006/0041759 A1 | 2/2006 | Kaliski et al. |
| 2006/0085328 A1 | 4/2006 | Cohen et al. |
| 2006/0091223 A1 | 5/2006 | Zellner |
| 2006/0161435 A1 | 7/2006 | Atef et al. |
| 2006/0163353 A1 | 7/2006 | Moulette et al. |
| 2006/0174104 A1 | 8/2006 | Crichton et al. |
| 2006/0196931 A1 | 9/2006 | Holtmanns et al. |
| 2006/0256961 A1 | 11/2006 | Brainard et al. |
| 2007/0034700 A1 | 2/2007 | Poidomani et al. |
| 2007/0114274 A1 | 5/2007 | Gibbs et al. |
| 2007/0124321 A1 | 5/2007 | Szydlo |
| 2007/0139802 A1* | 6/2007 | Kuribayashi et al. .......... 360/39 |
| 2007/0152070 A1 | 7/2007 | D'Albore |
| 2007/0152072 A1 | 7/2007 | Frallicciardi et al. |
| 2007/0153487 A1 | 7/2007 | Frallicciardi et al. |
| 2007/0174614 A1 | 7/2007 | Duane et al. |
| 2007/0192249 A1 | 8/2007 | Biffle et al. |
| 2007/0241183 A1 | 10/2007 | Brown et al. |
| 2007/0241201 A1 | 10/2007 | Brown et al. |
| 2007/0256123 A1 | 11/2007 | Duane et al. |
| 2007/0291753 A1 | 12/2007 | Romano |
| 2008/0005510 A1 | 1/2008 | Sepe et al. |
| 2008/0008315 A1 | 1/2008 | Fontana et al. |
| 2008/0008322 A1 | 1/2008 | Fontana et al. |
| 2008/0010675 A1 | 1/2008 | Massascusa et al. |
| 2008/0016351 A1 | 1/2008 | Fontana et al. |
| 2008/0019507 A1 | 1/2008 | Fontana et al. |
| 2008/0028447 A1 | 1/2008 | O'Malley et al. |
| 2008/0040271 A1 | 2/2008 | Hammad et al. |
| 2008/0040276 A1 | 2/2008 | Hammad et al. |
| 2008/0058016 A1 | 3/2008 | Di Maggio et al. |
| 2008/0059379 A1 | 3/2008 | Ramaci et al. |
| 2008/0096326 A1 | 4/2008 | Reed |
| 2008/0126398 A1 | 5/2008 | Cimino |
| 2008/0128515 A1 | 6/2008 | Di Iorio |
| 2008/0148394 A1 | 6/2008 | Poidomani et al. |
| 2008/0201264 A1 | 8/2008 | Brown et al. |
| 2008/0209550 A1 | 8/2008 | Di Iorio |
| 2008/0288699 A1 | 11/2008 | Chichierchia |
| 2008/0294930 A1 | 11/2008 | Varone et al. |
| 2008/0302877 A1 | 12/2008 | Musella et al. |
| 2009/0013122 A1 | 1/2009 | Sepe et al. |
| 2009/0036147 A1 | 2/2009 | Romano |
| 2009/0046522 A1 | 2/2009 | Sepe et al. |
| 2009/0108064 A1 | 4/2009 | Fernandes et al. |
| 2009/0150295 A1 | 6/2009 | Hatch et al. |
| 2009/0152365 A1 | 6/2009 | Li et al. |
| 2009/0242648 A1 | 10/2009 | Di Sirio et al. |
| 2009/0244858 A1 | 10/2009 | Di Sirio et al. |
| 2009/0253460 A1 | 10/2009 | Varone et al. |
| 2009/0255996 A1 | 10/2009 | Brown et al. |
| 2009/0290704 A1 | 11/2009 | Cimino |
| 2009/0303885 A1 | 12/2009 | Longo |
| 2011/0028184 A1 | 2/2011 | Cooper |

FOREIGN PATENT DOCUMENTS

| | | |
|---|---|---|
| WO | WO0247019 | 6/2002 |
| WO | WO2006066322 | 6/2006 |
| WO | WO2006080929 | 8/2006 |
| WO | WO2006105092 | 10/2006 |
| WO | WO2006116772 | 11/2006 |
| WO | WO2008064403 | 6/2008 |

OTHER PUBLICATIONS

U.S. Appl. No. 60/675,388, Poidomani et al.
The Bank Credit Card Business. Second Edition, American Bankers Association, Washington, D.C., 1996.
A Day in the Life of a Flux Reversal. http://www.phrack.org/issues.html?issue=37&id=6#article. As viewed on Apr. 12, 2010.
Dynamic Virtual Credit Card Numbers. http://homes.cerias.purdue.edu/~jtli/paper/fc07.pdf. As viewed on Apr. 12, 2010.
English translation of JP 05210770 A.

* cited by examiner

DATA MODIFICATION FOR MAGNETIC CARDS AND DEVICES

CROSS-REFERENCE TO RELATED APPLICATION

This application claims the benefit of U.S. Provisional Patent Application No. 61/562,165, titled "DATA MODIFICATION FOR MAGNETIC CARDS AND DEVICES," filed Nov. 21, 2011, which is hereby incorporated by reference herein in its entirety.

BACKGROUND OF THE INVENTION

This invention relates to magnetic cards and devices and associated payment systems.

SUMMARY OF THE INVENTION

A card (e.g., a powered card) may include a dynamic magnetic communications device. Such a dynamic magnetic communications device may take the form of a magnetic encoder or a magnetic emulator. A magnetic encoder may change the information located on a magnetic medium such that a magnetic stripe reader may read changed magnetic information from the magnetic medium. A magnetic emulator may generate electromagnetic fields that directly communicate data to a magnetic stripe reader. Such a magnetic emulator may communicate data serially to a read-head of the magnetic stripe reader.

A card (e.g., a non-powered card) may include a static magnetic communications device. Such a static magnetic communications device may take the form of a magnetic stripe. Data may be programmed onto the magnetic stripe by a magnetic stripe writer that records information onto the magnetic stripe by altering the magnetism of particles (e.g., iron-based particles) distributed along the magnetic stripe. The recorded data may be read by a magnetic stripe reader by swiping the magnetic stripe through the magnetic stripe reader.

All, or substantially all, of the front as well as the back of a card may be a display (e.g., bi-stable, non bi-stable, LCD, LED, or electrochromic display). Electrodes of a display may be coupled to one or more capacitive touch sensors such that a display may be provided as a touch-screen display. Any type of touch-screen display may be utilized. Such touch-screen displays may be operable of determining multiple points of touch. Accordingly, a barcode may be displayed across all, or substantially all, of a surface of a card. In doing so, computer vision equipment such as barcode readers may be less susceptible to errors in reading a displayed barcode.

A card may include a number of output devices to output dynamic information. For example, a card may include one or more RFIDs or IC chips (e.g., EMV chips) to communicate to one or more RFID readers or IC chip readers, respectively. A card may include devices to receive information. For example, an RFID and IC chip (e.g., EMV chip) may both receive information and communicate information to an RFID and IC chip reader, respectively.

A device for receiving wireless information signals may be provided. A light sensing device or sound sensing device may be utilized to receive information wirelessly. A card may include a central processor that communicates data through one or more output devices simultaneously (e.g., an RFID, IC chip, and a dynamic magnetic stripe communications device). The central processor may receive information from one or more input devices simultaneously (e.g., an RFID, IC chip, dynamic magnetic stripe devices, light sensing device, and a sound sensing device). A processor may be coupled to surface contacts such that the processor may perform the processing capabilities of, for example, an EMV chip. The processor may be laminated over and not exposed such that such a processor is not exposed on the surface of the card.

A card may include one or more light transmitters and light receivers. The light transmitters and receivers may be the same, or different, devices. A light transmitter may be able to transmit visible, infrared, or visible and infrared light. A light transmitter may be able to transmit additional types of light (e.g., ultraviolet light). A light receiver may be able to receive visible, infrared, or visible and infrared light. A light receiver may be able to receive additional types of light (e.g., ultraviolet light). A light transmitter may take the form of, for example, an LED. A light receiver may take the form of, for example, a photo-transistor, photo-diode, photo-resistor, or an LED.

A card may include a light transmitter (e.g., an infrared transmitter) about one end of the card and a light receiver (e.g., an infrared receiver) about the opposite end of the card. In doing so, the light transmitter and receiver may be located at a distance from one another (e.g., greater than half an inch, one inch, one and a half inches, two inches, or two and a half inches away from one another) such that the light receiver of the card cannot pick up transmissions from the light transmitter of the card. For example, a light receiver may be located along about a top edge of a card at a particular distance from one side edge (e.g., 1.067 inches from one side edge). A light transmitter may also be located about the top edge at that same particular distance from the other side edge (e.g., 1.067 inches from the other side edge). Accordingly, a programming fixture may include a light transmitter spaced similarly from a light receiver such that the light receiver of the programming fixture may communicate with the light transmitter of the card and the light transmitter of the programming fixture may communicate with the light receiver of that same card. In this manner, cards may be moved through the programming fixture and stopped in front of the programming fixture for programming. A programming module may be included with one or more programming fixtures such that multiple programming fixtures may simultaneously program cards.

The programming module may be able to communicate with an entity (e.g., a remote server) to, for example, download information to be programmed into a memory of a card. The programming module may be able to communicate with an entity (e.g., a remote server) to, for example, upload information confirming data programmed into a memory of a card.

Various types of information may be programmed into a memory of a card. Payment account information, for example, such as the account holder's name, payment account number, discretionary data, and expiration date of the payment account may be programmed into a memory of a card. Account information for one or more accounts (e.g., credit, debit, gift, medical, or security accounts) may be programmed into a memory of a card. Once programmed, a programming module may read the account information back from the card and may, for example, verify that the account information matches account information intended for that card.

A memory of a card may, for example, receive processing instructions (e.g., firmware) that may be executed by a processor of a card. Such processing instructions may include a communication algorithm that may communicate information associated with one or more accounts that may be programmed into a memory of the card. Such information may be communicated as a magnetic stripe message (e.g., one, two, and/or three tracks of magnetic stripe data) to a magnetic stripe reader (e.g., communicated to the magnetic stripe reader after a presence of the magnetic stripe reader has been detected). Accordingly, for example, the magnetic stripe message may be forwarded onto a network entity (e.g., a remote server) to complete a purchase transaction.

The communication algorithm may compute a longitudinal redundancy check (LRC) value prior to communication of the magnetic stripe message. Such an LRC value may be computed as a function of the magnetic stripe message, such that a particular message may yield a unique LRC value (e.g., a unique LRC character). Accordingly, for example, an LRC character may be computed with each magnetic stripe message (e.g., a unique LRC character may be computed for each of a first and a second track of a magnetic stripe data) and then communicated to a magnetic stripe reader (e.g., an LRC character may be appended to each of the first and second magnetic stripe data strings and then communicated to the magnetic stripe reader). The magnetic stripe reader may compute its own LRC character based upon the magnetic stripe message received from a card and may compare the computed LRC character to the LRC character received from the card to determine whether the magnetic stripe message was received correctly.

Certain LRC characters may be known to cause certain magnetic stripe readers to interpret a received magnetic stripe message incorrectly even though the magnetic stripe message may have been received correctly. For example, a magnetic stripe message (e.g., a first track of magnetic stripe data) may yield an LRC exception that is known to cause receive errors in one or more magnetic stripe readers (e.g., the magnetic stripe reader may discard magnetic stripe data associated with certain LRC characters received).

Accordingly, for example, a processor of a powered card may detect that a particular LRC character of a particular magnetic stripe message may be problematic for certain magnetic stripe readers and may modify the magnetic stripe message (e.g., modify at least a portion of a discretionary data field of the magnetic stripe message) so as to change the LRC character associated with the magnetic stripe message prior to communicating the magnetic stripe message. In so doing, for example, LRC characters associated with magnetic stripe messages may be screened and modified, if necessary, so as to increase a likelihood that a magnetic stripe message may be accepted by a magnetic stripe reader.

LRC characters programmed onto static magnetic stripes of non-powered cards may be known to be problematic for certain magnetic stripe readers. Accordingly, for example, prior to programming a static magnetic stripe card, a programming module may first screen LRC characters of the first, second, and/or third tracks of magnetic stripe data for LRC exceptions. If any LRC characters match with any LRC exceptions, the programming module may modify the first, second, and/or third tracks of magnetic stripe data (e.g., modify at least a portion of discretionary data fields within the first, second, and/or third tracks of magnetic stripe data) to change the LRC character. Once modified, the first, second, and/or third tracks of magnetic stripe data may be programmed onto the static magnetic stripe along with the modified LRC characters.

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which.

DETAILED DESCRIPTION OF THE INVENTION

Figure 1:
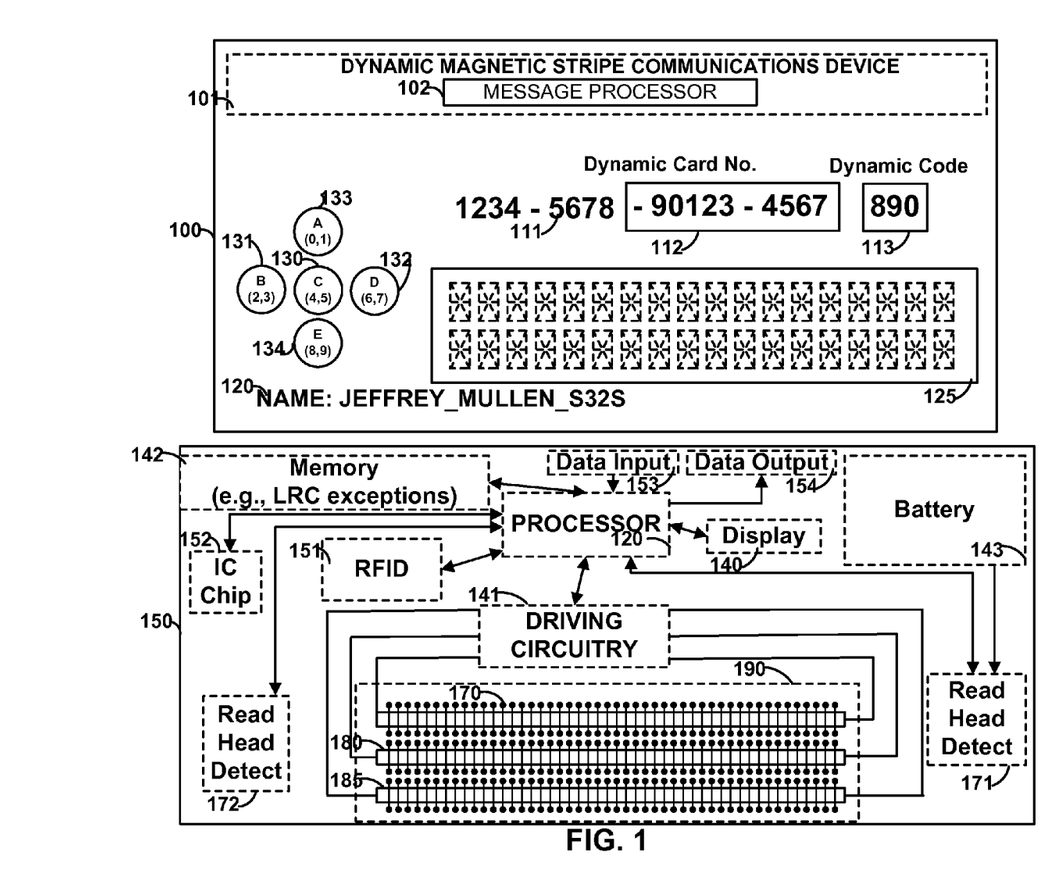
FIG. 1 is an illustration of cards constructed in accordance with the principles of the present invention.

FIG. 1 shows card 100 that may include, for example, a dynamic number that may be entirely, or partially, displayed via display 112. A dynamic number may include a permanent portion such as, for example, permanent portion 111. Permanent portion 111 may be printed as well as embossed or laser etched on card 100.

Multiple displays may be provided on a card. For example, display 113 may be utilized to display a dynamic code such as a dynamic security code. Display 125 may also be provided to display logos, barcodes, as well as multiple lines of information. A display may be a bi-stable display or non bi-stable display. Permanent information 120 may also be included and may include information such as information specific to a user (e.g., a user's name or username) or information specific to a card (e.g., a card issue date or a card expiration date).

Card 100 may include one or more buttons such as buttons 130-134. Such buttons may be mechanical buttons, capacitive buttons, or a combination of mechanical and capacitive buttons.

Message processor 102 may formulate magnetic stripe messages to be communicated by dynamic magnetic stripe communications device 101. A magnetic stripe message may, for example, include a payment account number (e.g., a payment account number comprised of permanent portion 111 and dynamic portion 112). A magnetic stripe message may, for example, include information associated with the cardholder (e.g., permanent information 120).

Message processor 102 may, for example, compute an LRC value (e.g., an LRC character associated with a magnetic stripe message) that may be communicated to a magnetic stripe reader. Message processor 102 may, for example, compare the computed LRC character against a list of LRC exceptions. If the computed LRC character matches an LRC exception, then message processor 102 may modify the magnetic stripe message (e.g., modify at least a portion of a discretionary data field of the magnetic stripe message). Once modified, message processor 102 may recompute the LRC character based on the modified magnetic stripe message and verify that the newly created LRC value does not match any LRC exception. Once verified, message processor 102 may communicate the modified magnetic stripe message and associated LRC character to a magnetic stripe reader.

Architecture 150 may be utilized with any card. Architecture 150 may include processor 120. Processor 120 may have on-board memory for storing information (e.g., a list of LRC exceptions). Any number of components may communicate to processor 120 and/or receive communications from processor 120. For example, one or more displays (e.g., display 140) may be coupled to processor 120. Persons skilled in the art will appreciate that components may be placed between particular components and processor 120. For example, a display driver circuit may be coupled between display 140 and processor 120.

Memory 142 may be coupled to processor 120. Memory 142 may include data that is unique to a particular set of devices (e.g., a set of magnetic stripe readers). For example, memory 142 may store a list of LRC exceptions that are known to cause read errors within a particular set of magnetic stripe readers.

Memory 142 may receive data as received from data input 153 (e.g., an IR receiver). For example, data may be received by memory 142 that may be indicative of a universal identification number associated with a card (e.g., card 100 of FIG. 1). Such a universal identification number may, for example, uniquely identify a card (e.g., card 100 of FIG. 1). Memory 142 may receive data via data input 153 that may represent a security code that may be associated with the universal identification number of a card (e.g., card 100 of FIG. 1).

Memory 142 may provide data, such as a universal identification number associated with a card (e.g., card 100 of FIG. 1), to data output 154. Accordingly, data output 154 (e.g., an IR transmitter) may transmit such a universal identification number to, for example, a programming module. The programming module may relay the universal identification number to an entity (e.g., a remote server), which in turn, may respond with personalization data that may be associated with the universal identification number of a card (e.g., card 100 of FIG. 1).

Memory 142 may receive data from data input 153 (e.g., an IR receiver) that may be associated with a universal identification number of a card (e.g., card 100 of FIG. 1). For example, one or more account numbers, user names, discretionary data, and expiration dates may be stored within memory 142. Such data may be provided by a card (e.g., card 100 of FIG. 1), for example, as one or more tracks of magnetic stripe data during a transaction (e.g., a purchase transaction).

Any number of reader communication devices may be included in architecture 150. For example, IC chip 152 may be included to communicate information to an IC chip reader. IC chip 152 may be, for example, an EMV chip. As per another example, RFID 151 may be included to communicate information to an RFID reader. A magnetic stripe communications device may also be included to communicate information to a magnetic stripe reader. Such a magnetic stripe communications device may provide electromagnetic signals to a magnetic stripe reader.

Different electromagnetic signals may be communicated to a magnetic stripe reader to provide different tracks of data. For example, electromagnetic field generators 170, 180, and 185 may be included to communicate separate tracks of information to a magnetic stripe reader. Such electromagnetic field generators may include a coil wrapped around one or more materials (e.g., a magnetic material and/or a non-magnetic material).

Each electromagnetic field generator may communicate information serially to a receiver of a magnetic stripe reader for a particular magnetic stripe track. Read-head detectors 171 and 172 may be utilized to sense the presence of a magnetic stripe reader (e.g., a read-head housing of a magnetic stripe reader). The sensed information may be communicated to processor 120 to cause processor 120 to communicate information serially from electromagnetic generators 170, 180, and 185 to magnetic stripe track receivers in a read-head housing of a magnetic stripe reader. Accordingly, a magnetic stripe communications device may change the information communicated to a magnetic stripe reader at any time.

Processor 120 may, for example, communicate user-specific information and card-specific information through RFID 151, IC chip 152 (e.g., EMV chip 152), data output (e.g., IR data output 154), data input (e.g., IR data input 153) and electromagnetic generators 170, 180, and 185 to readers coupled to information processing servers. Driving circuitry 141 may be utilized by processor 120, for example, to control electromagnetic generators 170, 180, and 185.

Figure 2:
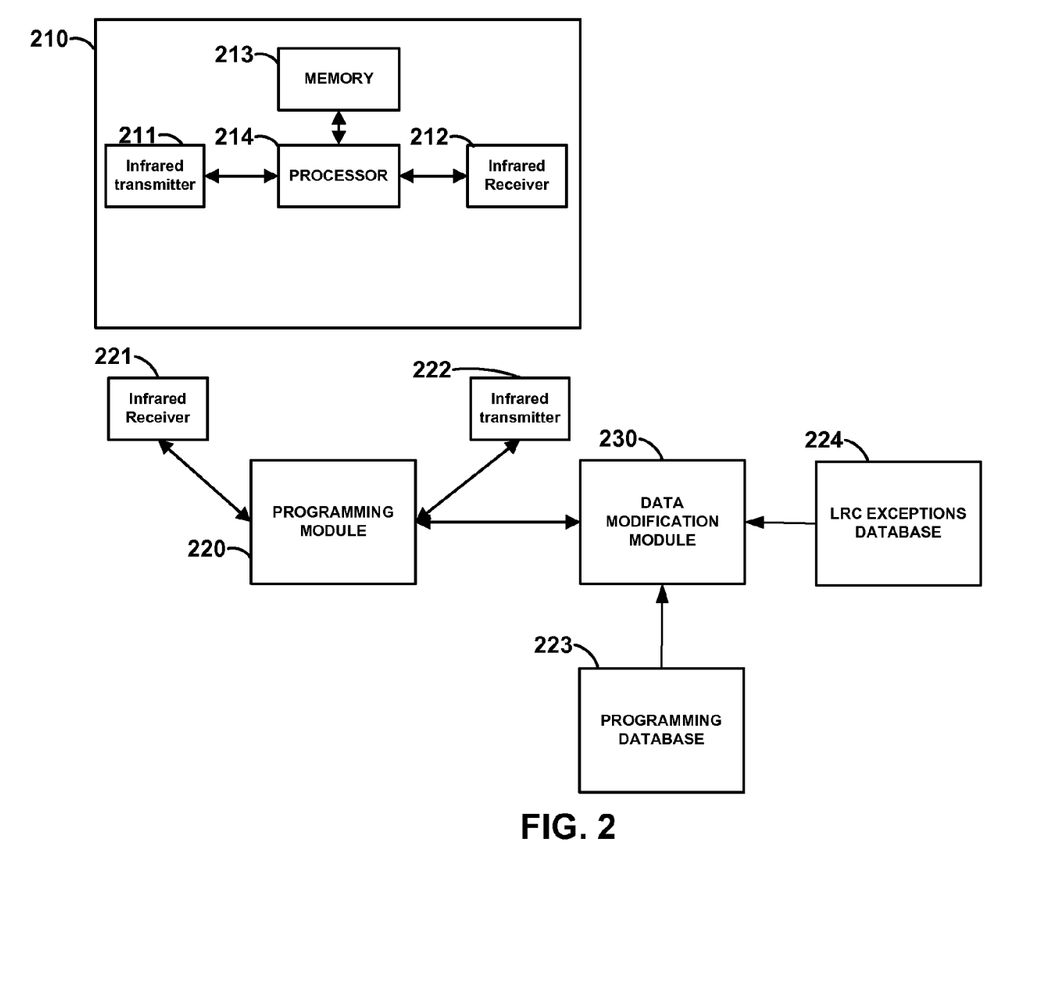
FIG. 2 is an illustration of a programming system constructed in accordance with the principles of the present invention.

FIG. 2 shows card 210 that may include memory 213 (e.g., for storing application code and personal information), transmitter 211, processor 214, and infrared receiver 212. Persons skilled in the art will appreciate that card 210 may include, for example, an infrared receiver and an LED capable of emitting visible light to perform communications with a programming module. Such a light-emitting-diode may, alternatively for example, be capable of emitting infrared light. A receiver may be, for example, an infrared sensitive photo-transistor or an LED.

Programming module 220 may be coupled to receiver 221 and transmitter 222. Receiver 221 may be coupled to IR transmitter 211 and transmitter 222 may be coupled to IR receiver 212. Accordingly, programming data retrieved from an entity (e.g., programming database 223) may be programmed into memory 213 of card 210.

Programming database 223 may be utilized, for example, to retrieve personal information for a card (e.g., a customer's name, security code, credit card number, expiration date, and discretionary data). This information may be stored on memory 213 of card 210 and utilized by processor 214 to communicate this information through an output device operable to be read by a reader (e.g., an exposed IC chip, RFID, or dynamic magnetic stripe communications device).

Data modification module 230 may receive personal information from programming database 223 and may compute a first, a second, and or a third track of magnetic stripe data based upon the personal information received. In addition, an LRC value may be computed for each track of magnetic stripe data generated. Data modification module 230 may compare each LRC value generated against a list of LRC exceptions that may be provided by LRC exceptions database 224. If a generated LRC value matches an LRC exception, for example, then data modification module 230 may modify the track of magnetic stripe data associated with the generated LRC value. For example, at least a portion of a discretionary data field within a track of magnetic stripe data may be modified so as to change the LRC value associated with the track of magnetic stripe data. The changed LRC value may again be compared against a list of LRC exceptions to verify that the changed LRC value does not match an LRC exception. Once verified, programming module 223 may program the personal data into memory 213 of card 210.

Persons skilled in the art will appreciate that several tracks of magnetic stripe data may be programmed into memory 213 of card 210. For example, card 210 may be associated with multiple payment accounts and may, for example, store a first, a second, and or a third track of magnetic stripe data for each payment account that may be associated with card 210. Accordingly, for example, an LRC value for each track of magnetic stripe data to be stored within memory 213 of card 210 may be compared against a list of LRC exceptions contained within LRC exceptions database 224. If a match exists, then data modification module 230 may modify the offending track of magnetic stripe data (e.g., by modifying at least a portion of a discretionary data field contained within the offending track of magnetic stripe data) so that the associated LRC value may also change.

Figure 3:
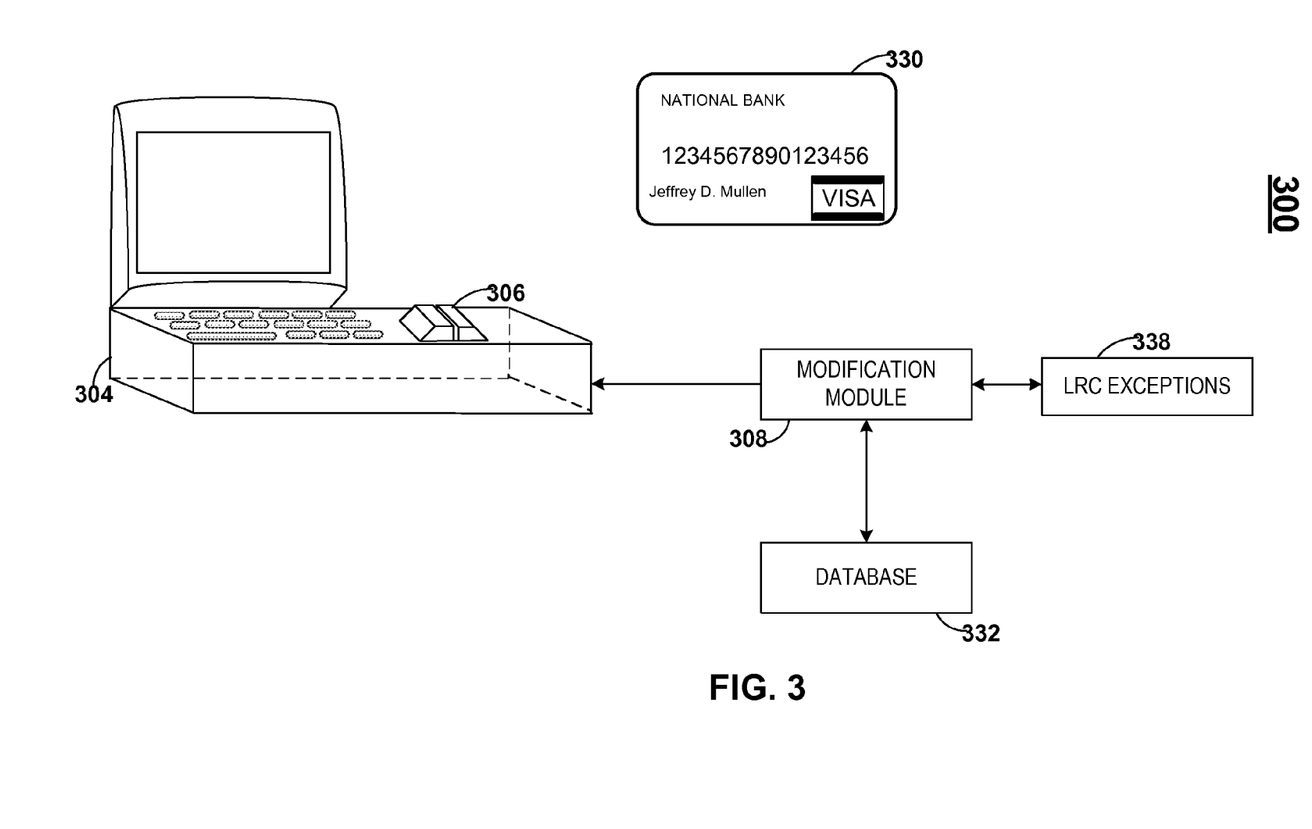
FIG. 3 is an illustration of a programming system constructed in accordance with the principles of the present invention.

FIG. 3 shows programming system 300, which may include one or more programming modules 304, one or more programming machine writer modules (e.g., magnetic stripe writer 306), static magnetic stripe card 330, LRC exceptions database 338, modification module 308, and database 332. Card 330 may, for example, be a non-powered card having a static magnetic stripe that may be programmed by swiping card 330 through magnetic stripe writer 306.

Database 332 may contain programming information that may be programmed onto the static magnetic stripe of non-powered card 330. Programming information may include, for example, the account holder's name, account number, expiration date, and discretionary data. Modification module 308 may receive the programming information from database 332 and may formulate the first, second, and/or third tracks of magnetic stripe data from the received programming information. Additionally, modification module 308 may compute an LRC value for each of the first, second, and/or third tracks of magnetic stripe data that may be formulated.

Modification module 308 may receive a list of LRC exceptions 338 that may be known to cause errors when certain magnetic stripe readers receive such LRC exceptions. LRC exceptions database 338 may, for example, include a list of magnetic stripe readers and an associated list of LRC values that are known to cause read errors when received by the magnetic stripe readers.

Accordingly, for example, modification module 308 may compute the LRC values for each of the first, second, and/or third tracks of magnetic stripe data generated from programming information received from database 332 and may compare the computed LRC values to the LRC values that may exist within LRC exceptions 338. If a match between the computed LRC values and one or more LRC exceptions exist, then modification module 308 may modify one or more tracks of magnetic stripe data (e.g., at least a portion of the discretionary data fields of the first, second, and/or third tracks of magnetic stripe data) and may recompute the respective one or more LRC values. Once the recomputed LRC values are determined not to match any LRC exception, then modification module may forward the one, two, and/or three tracks of magnetic stripe information to programming module 304. Card 330 may, for example, be swiped through magnetic stripe writer 306 so that the static magnetic stripe of card 330 may be programmed with the one, two, and/or three tracks of magnetic stripe data whose associated LRC values do not match any known LRC exception.

Figure 4:
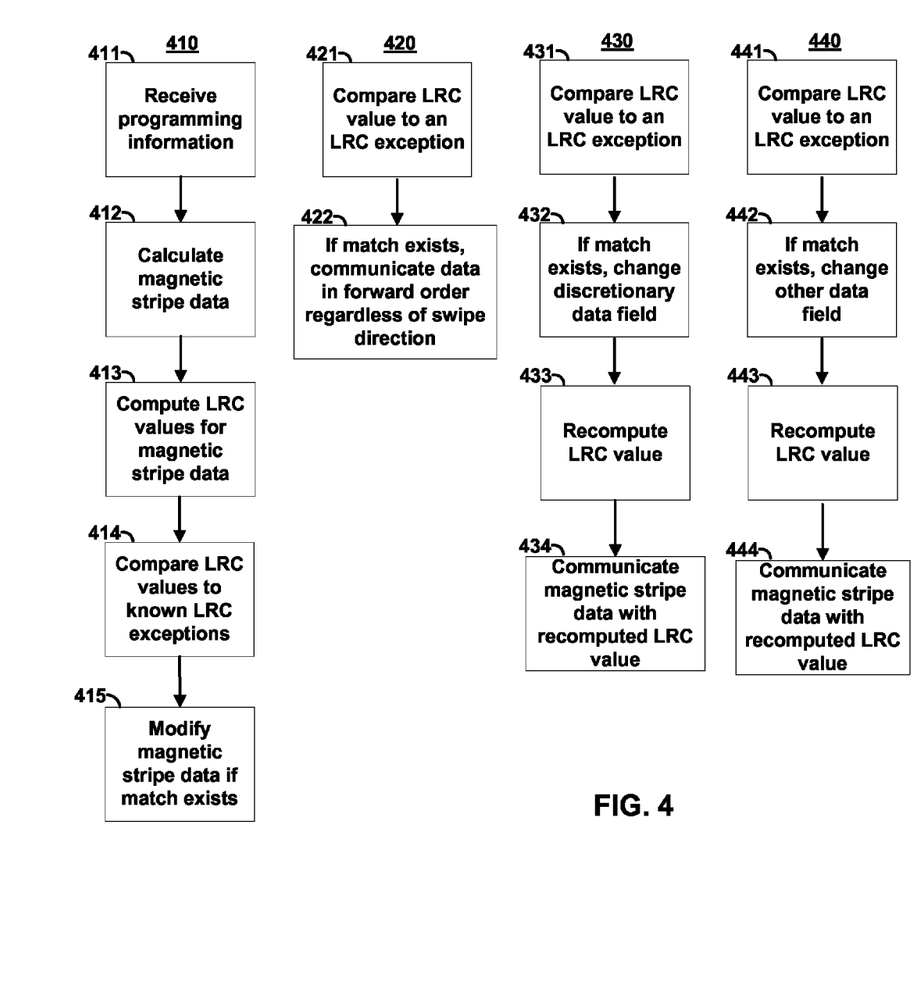
FIG. 4 is an illustration of process flow charts constructed in accordance with the principles of the present invention.

A flow diagram of process sequences is shown in FIG. 4. Step 411 of sequence 410 may include, for example, receiving programming information from a database (e.g., a remote database). Such programming information may, for example, include an account holder's name, an account number, an expiration date, and discretionary data. In step 412, the programming information may be converted into a magnetic stripe message (e.g., one, two, and/or three tracks of magnetic stripe data). In step 413, LRC values may be computed for each of the one, two, and/or three tracks of magnetic stripe data. In step 414, the computed LRC values may be compared to a list of LRC exceptions (e.g., $51_H$ or $1A_H$) that may be known to cause errors when received by certain magnetic stripe readers. If a match results from the comparison, then the magnetic stripe message may be modified so as to result in a change in the associated LRC character(s) without affecting any of the primary data that is to be programmed onto a static magnetic stripe of a card. Once modified, the one, two, and/or three tracks of magnetic stripe data and associated LRC characters may be programmed onto the static magnetic stripe of the card.

Step 421 of sequence 420 may include, for example, executing a communication algorithm by a processor of a powered card to compare an LRC value associated with a track of magnetic stripe data stored within the powered card to an LRC exception. If a match exists, then the powered card may communicate the magnetic stripe message in a forward order (e.g., start sentinel, followed by account information, followed by end sentinel, followed by LRC character) regardless of a detected swipe direction. In so doing, for example, errors within magnetic stripe readers that may be caused by receiving a magnetic stripe message in reverse order (e.g., LRC character in reverse bit order, followed by end sentinel in reverse bit order, followed by account information in reverse bit order, followed by start sentinel in reverse bit order) may be obviated.

Step 431 of sequence 430 may include, for example, comparing an LRC character that is associated with a track of magnetic stripe data to a list of known LRC exceptions that may cause read errors to occur within magnetic stripe readers that receive such LRC characters. If the comparison yields a match, then a discretionary data field (e.g., at least one bit of a discretionary data field) may be modified (e.g., as in step 432), so that the corresponding LRC character associated with the track of magnetic stripe data may also change once computed (e.g., as in step 433). A processor of a powered card, for example, may make such a comparison and then modify the magnetic stripe message before communicating the message to a magnetic stripe reader. A processor of a programming module, for example, may make such a comparison and then modify the one or more tracks of magnetic stripe data accordingly before the magnetic stripe data is programmed onto a static magnetic stripe. In step 434, the modified magnetic stripe data and recomputed LRC character may be communicated to a magnetic stripe reader by swiping either of the powered card or non-powered card through the magnetic stripe reader.

Step 441 of sequence 440 may include, for example, comparing an LRC character that is associated with a track of magnetic stripe data to a list of known LRC exceptions that may cause read errors to occur within magnetic stripe readers that receive such LRC characters. If the comparison yields a match, then a data field (e.g., a data field other than a discretionary data field) may be modified (e.g., removing a period after a middle initial of the card holder's name as in step 442), so that the corresponding LRC character associated with the track of magnetic stripe data may also change once computed (e.g., as in step 443). A processor of a powered card, for example, may make such a comparison and then modify the magnetic stripe message before communicating the message to a magnetic stripe reader. A processor of a programming module, for example, may make such a comparison and then modify the track of magnetic stripe data accordingly before the magnetic stripe data is programmed onto a static magnetic stripe. In step 444, the modified magnetic stripe data and recomputed LRC character may be communicated to a magnetic stripe reader by swiping either of the powered card or non-powered card through the magnetic stripe reader.

Persons skilled in the art will appreciate that the present invention is not limited to only the embodiments described. Instead, the present invention more generally involves dynamic information. Persons skilled in the art will also appreciate that the apparatus of the present invention may be implemented in other ways than those described herein. All such modifications are within the scope of the present invention, which is limited only by the claims that follow.

What is claimed is:

1. A method comprising:
generating a magnetic stripe message;
computing an LRC based on the magnetic stripe message;
comparing the computed LRC to a list of LRC exceptions; and
changing a data value in the magnetic stripe message based upon a positive comparison,
wherein the computed LRC changes based on the changed data value.

2. The method of claim 1, wherein the changed data value includes at least a portion of a discretionary data field within the magnetic stripe message.

3. The method of claim 1, wherein the computing an LRC based on the magnetic stripe message includes computing, by a payment device, the LRC based on the magnetic stripe message.

4. The method of claim 1, wherein the comparing the computed LRC to a list of LRC exceptions includes comparing, by a payment device, the computed LRC to the list of LRC exceptions.

5. The method of claim 1, wherein the changing a data value in the magnetic stripe message based upon a positive comparison includes changing, by a payment device, the data value in the magnetic stripe message based upon the positive comparison.

6. The method of claim 1, wherein the computing an LRC based on the magnetic stripe message includes computing, by a payment device, the LRC based on the magnetic stripe message, and
the comparing the computed LRC to a list of LRC exceptions includes comparing, by the payment device, the computed LRC to the list of LRC exceptions.

7. The method of claim 1, wherein the computing an LRC based on the magnetic stripe message includes computing, by a payment device, the LRC based on the magnetic stripe message, and
the changing a data value in the magnetic stripe message based upon a positive comparison includes changing, by the payment device, the data value in the magnetic stripe message based upon the positive comparison.

8. The method of claim 1, wherein the computing an LRC based on the magnetic stripe message includes computing, by a payment device, the LRC based on the magnetic stripe message,
the comparing the computed LRC to a list of LRC exceptions includes comparing, by the payment device, the computed LRC to the list of LRC exceptions, and
the changing a data value in the magnetic stripe message based upon a positive comparison includes changing, by the payment device, the data value in the magnetic stripe message based upon the positive comparison.

9. The method of claim 1, wherein the computing an LRC based on the magnetic stripe message includes computing, by a card, the LRC based on the magnetic stripe message.

10. The method of claim 1, wherein the comparing the computed LRC to a list of LRC exceptions includes comparing, by a card, the computed LRC to the list of LRC exceptions.

11. The method of claim 1, wherein the changing a data value in the magnetic stripe message based upon a positive comparison includes changing, by a card, the data value in the magnetic stripe message based upon the positive comparison.

12. The method of claim 1, wherein the computing an LRC based on the magnetic stripe message includes computing, by a card, the LRC based on the magnetic stripe message, and
the comparing the computed LRC to a list of LRC exceptions includes comparing, by the card, the computed LRC to the list of LRC exceptions.

13. The method of claim 1, wherein the computing an LRC based on the magnetic stripe message includes computing, by a card, the LRC based on the magnetic stripe message, and
the changing a data value in the magnetic stripe message based upon a positive comparison includes changing, by the card, the data value in the magnetic stripe message based upon the positive comparison.

14. The method of claim 1, wherein the computing an LRC based on the magnetic stripe message includes computing, by a card, the LRC based on the magnetic stripe message,
the comparing the computed LRC to a list of LRC exceptions includes comparing, by the card, the computed LRC to the list of LRC exceptions, and
the changing a data value in the magnetic stripe message based upon a positive comparison includes changing, by the card, the data value in the magnetic stripe message based upon the positive comparison.

15. The method of claim 1, wherein the computing an LRC based on the magnetic stripe message includes computing, by a programming system, the LRC based on the magnetic stripe message.

16. The method of claim 1, wherein the comparing the computed LRC to a list of LRC exceptions includes comparing, by a programming system, the computed LRC to the list of LRC exceptions.

17. The method of claim 1, wherein the changing a data value in the magnetic stripe message based upon a positive comparison includes changing, by a programming system, the data value in the magnetic stripe message based upon the positive comparison.

18. The method of claim 1, wherein the computing an LRC based on the magnetic stripe message includes computing, by a programming system, the LRC based on the magnetic stripe message, and
the comparing the computed LRC to a list of LRC exceptions includes comparing, by the programming system, the computed LRC to the list of LRC exceptions.

19. The method of claim 1, wherein the computing an LRC based on the magnetic stripe message includes computing, by a programming system, the LRC based on the magnetic stripe message, and
the changing a data value in the magnetic stripe message based upon a positive comparison includes changing, by the programming system, the data value in the magnetic stripe message based upon the positive comparison.

20. The method of claim 1, wherein the computing an LRC based on the magnetic stripe message includes computing, by a programming system, the LRC based on the magnetic stripe message,
the comparing the computed LRC to a list of LRC exceptions includes comparing, by the programming system, the computed LRC to the list of LRC exceptions, and
the changing a data value in the magnetic stripe message based upon a positive comparison includes changing, by the programming system, the data value in the magnetic stripe message based upon the positive comparison.

* * * * *